United States Patent
Rowlands et al.

[11] Patent Number: 5,808,714
[45] Date of Patent: Sep. 15, 1998

[54] LOW REFLECTION SHADOW MASK

[75] Inventors: Scott F. Rowlands, Santa Rosa; Scott C. McEldowney, Windsor; Steven P. Bandettini, Forestville, all of Calif.

[73] Assignee: Optical Coating Laboratory, Inc., Santa Rosa, Calif.

[21] Appl. No.: 528,755

[22] Filed: Sep. 15, 1995

Related U.S. Application Data

[63] Continuation-in-part of Ser. No. 498,516, Jul. 5, 1995, abandoned, which is a continuation of Ser. No. 129,994, Sep. 30, 1993, abandoned.

[51] Int. Cl.⁶ .................................................. G02F 1/1335
[52] U.S. Cl. ........................ 349/110; 349/111; 349/105; 359/585; 359/589
[58] Field of Search .................................. 349/29, 58, 30, 349/105, 110, 111, 113, 114; 359/580, 582, 585, 586, 588, 589; 427/162, 163.1, 163.3, 165, 167; 430/5, 20, 6, 7, 321; 428/1, 620–623, 628–633

[56] References Cited

U.S. PATENT DOCUMENTS

| | | |
|---|---|---|
| 3,698,928 | 10/1972 | Blome . |
| 3,736,047 | 5/1973 | Gelber et al. . |
| 4,101,200 | 7/1978 | Daxinger . |
| 4,139,443 | 2/1979 | Sakurai . |
| 4,166,148 | 8/1979 | Sakurai . |
| 4,178,403 | 12/1979 | Sakurai et al. . |
| 4,363,846 | 12/1982 | Kaneki . |
| 5,039,204 | 8/1991 | Choi . |
| 5,155,609 | 10/1992 | Konno et al. ............................. 349/30 |
| 5,272,554 | 12/1993 | Ji et al. .................................... 359/72 |
| 5,282,070 | 1/1994 | Nishida et al. . |
| 5,367,393 | 11/1994 | Ohara et al. . |
| 5,566,011 | 10/1996 | Steigerwald ........................... 349/110 |
| 5,570,212 | 10/1996 | Steigerwald ........................... 349/110 |

FOREIGN PATENT DOCUMENTS 5127014   5/1993   Japan .

Primary Examiner—Hung X. Dang
Assistant Examiner—Tai V. Duong
Attorney, Agent, or Firm—Philip A. Dalton

[57] ABSTRACT

A very low reflectance optical coating comprising alternating layers of materials such as chromium oxide and chromium, silicon oxide and silicon, titanium oxide and titanium, and tantalum oxide and tantalum is suitable for use as a black shadow mask in liquid crystal displays, among various applications. Certain designs such as silicon oxide/silicon benefit from a transmission-decreasing overcoat of material such as molybdenum, germanium or titanium.

9 Claims, 3 Drawing Sheets

LOW REFLECTION SHADOW MASK

This is a continuation-in-part of commonly assigned U.S. patent application, Ser. No. 08/498,516, titled LOW REFLECTION SHADOW MASK, filed Jul. 5, 1995, now abandoned, in the name of inventors SCOTT F. ROWLANDS, SCOTT C. MCELDOWNEY, and STEVEN P. BANDETTINI; which is a file wrapper continuation of commonly assigned U.S. patent application, Ser. No. 08/129,994, titled LOW REFLECTION SHADOW MASK, filed Sep. 30, 1993, in the name of inventors SCOTT F. ROWLANDS, SCOTT C. MCELDOWNEY, and STEVEN P. BANDETTINI, abandoned.

1. BACKGROUND OF THE INVENTION a. Field of the Invention

The present invention relates to so-called low reflectance shadow mask coatings, which are useful for example in LCDs (liquid crystal displays) and as replacements for chrome photomasks.

b. Description of the Related Art

Liquid crystal displays incorporate a shadow mask which "apertures" the pattern required to create the images seen by the viewer. The individual apertures are called pixels; electronic displays are made up of many pixels. Each LCD pixel contains a pattern of color filters of red, green and blue which, when activated, provide the spatial information (picture) to the viewer. The resolution of the display is governed by the number of pixels per unit area.

Traditionally, the shadow mask has been constructed by depositing onto a transparent substrate a chromium coating of sufficient thickness so that the transmission of light through the chromium is nearly zero. The chromium is then etched to create a mask defining the pixel pattern required by the resolution of the display; approximately 35–50% of the chromium coating remains.

However, light incident from the viewer side of the display reflects off the remaining chromium coating, decreasing the contrast of the display. For chromium coatings, the amount of light reflected from the shadow mask can be as much as 25% which in adverse lighting conditions can result in the reflected image intensity exceeding the intensity of the transmitted display image.

One approach designed to diminish the above problem has been to apply a single layer of chromium oxide on the substrate prior to depositing the chromium coating. This shadow mask construction of substrate/chromium oxide/chromium ($Cr_xO_y$/Cr) reduces the reflectance from the chromium from as much as 25% to as little as about 2%. However, even 2% reflectance can greatly reduce the contrast of the display, to the point where the displayed information is unreadable in adverse lighting conditions.

Another solution to the above problem has been to utilize an induced absorption filter (dark mirror) comprising multilayers of metal and dielectric materials. These filters provide reflectance of less than 0.5% and have been used in the solar power industry to enhance the absorption of solar cells in the visible spectrum. If applied to LCDs, such filters would reduce the reflection from the shadow mask to less than 0.2% and would effectively make the contrast of the display independent of the background conditions. Unfortunately, such filters are made of dielectric materials ($MgF_2$ and $SiO_2$) and metals (molybdenum, Mo) which are incompatible with current pattern generation techniques. As a result, the use of such filters in LCDs would first require significant development in order to produce the current pixel patterns.

2. SUMMARY OF THE INVENTION

In one embodiment, the present invention is embodied in a very low reflectance optical composite which includes a substrate and a low reflectance coating formed on the substrate of pairs of alternating layers of material and an oxide of the material such as chromium oxide and chromium, silicon oxide and silicon, titanium oxide and titanium, and tantalum oxide and tantalum. Certain embodiments, such as silicon oxide/silicon, preferably include a transmission-decreasing overcoat of material such as molybdenum, germanium or titanium. Preferably the layer of material nearest adjacent the substrate is relatively thin.

In another aspect, the present invention is embodied in a liquid crystal display cover panel which includes a glass substrate and the low reflectance coating on the substrate.

3. BRIEF DESCRIPTION OF THE DRAWING

The above and other aspects of the invention are described with respect to the accompanying drawing, in which.

4. DETAILED DESCRIPTION OF THE PREFERRED EMBODIMENT(S)

Figure 1:
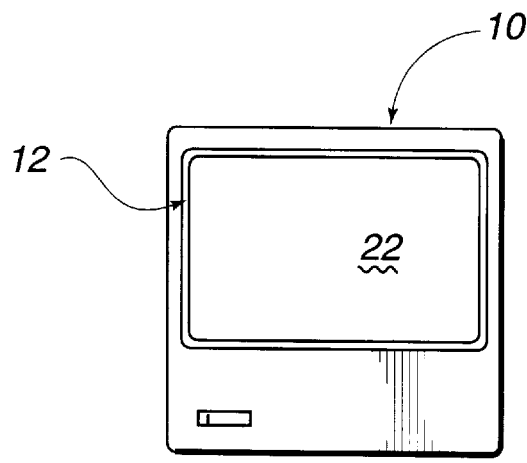
FIG. 1 is a front elevation view of an electronic display which uses a black shadow mask embodying the present invention.
Figure 2:
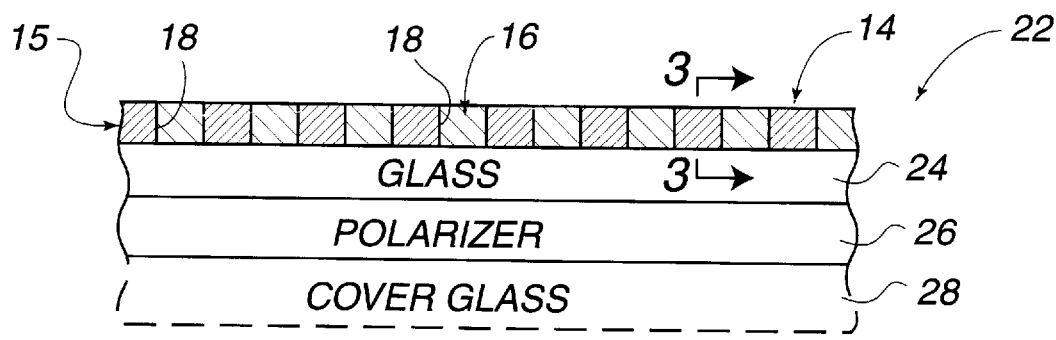
FIG. 2 is a schematic vertical cross section of a coating arrangement applied to the viewing screen of the electronic display of FIG. 1.

FIGS. 1 and 2 illustrate one application of the present invention. Here, electronic display 10, FIG.1, includes an LCD viewing screen 12 having a cover 22 containing a black matrix coating 15, FIG. 2. In the illustrated embodiment, the black matrix 15 comprises (1) a black shadow mask coating 14 which is formed on glass panel or substrate 24 of the LCD cover 22 and which has holes or apertures 18 therein, and (2) a monochromatic or color filter coating 16 (collectively, color coating 16 or color filter 16) formed in the holes. Typically, the cover includes the illustrated polarizer sheet 26 and optional cover glass panel 28.

The holes 18 in the black shadow mask coating 14 are the apertures for associated pixels (not shown) of the LCD. The coating 16 formed in the apertures 18 filters the light from the individual pixels to the desired color (red, green or blue for an RGB display).

The illustrated black matrix 15 typically is formed by depositing the shadow mask coating 14, using a conventional process such as PVD (physical vapor deposition), including evaporation or sputtering, etching aperture holes 18 therein using standard photolithography techniques (masking and wet or dry etching), then depositing the color or monochrome filter coating 16 in the apertures.

Quite obviously, in such applications, in addition to the requirement of low reflectance, the shadow mask coating must be durable but must be readily etchable.

Figure 3:
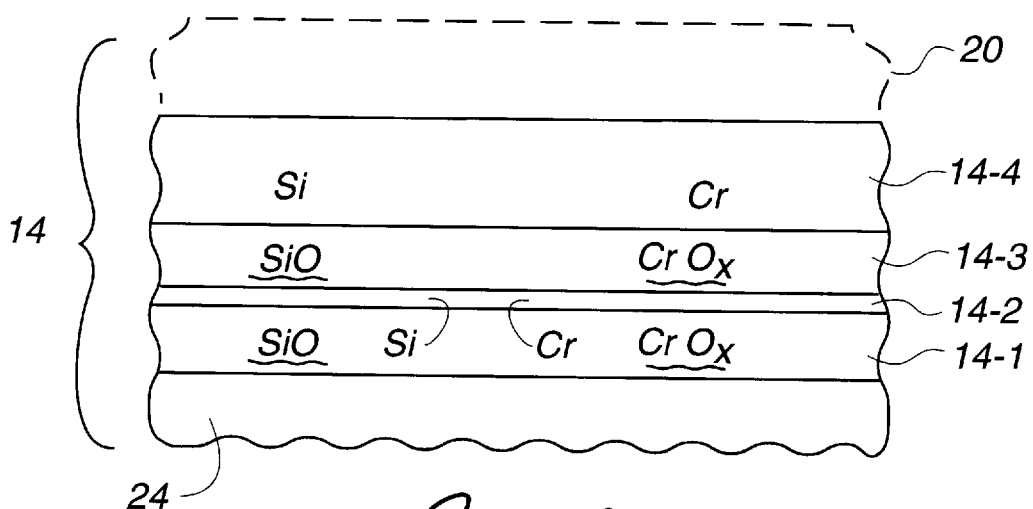
FIG. 3 is an enlarged schematic representation of a vertical cross section of the black shadow mask coating of FIG. 2.

Referring to FIG. 3, there is shown an enlarged schematic cross-section of the black shadow mask coating 14, which has the required durability and etchability and has very low reflectance. As mentioned, the coating 14 is formed on a substrate 24, in this case the glass front panel of the LCD display cover 12. The coating comprises a stack of two or more multiples of a pair of layers. Typically, the pair of layers comprises an layer of an element or material and a layer of a compound of that material, typically a dielectric compound. FIG. 3 illustrates a black shadow mask coating stack comprising two of the paired layers, with the first and the second pairs of layers being designated 14-1, 14-2 and 14-3, 14-4, respectively. FIG. 3 also illustrates an optional transmission-decreasing layer or overcoat 20.

Referring further to FIG. 3, in one embodiment the black shadow mask coating design comprises multilayers of chromium (Cr), an oxide of chromium ($CrO_x$), and/or an oxynitride of chromium ($CrO_xN_y$). In a preferred $Cr_xO_y$/Cr design, the black shadow mask comprises four alternating layers of chromium oxide and chromium. These layers are in the preferred sequence substrate/$Cr_xO_y$/Cr/$Cr_xO_y$/Cr, providing opacity and very low reflectance. The chromium and chromium oxide composite coating is durable, yet readily etchable by the etchants which are used to form the apertures 18. The chromium layer nearest the substrate, layer 14-2 in FIG. 3, is the critical component in that it is thin relative to the other chromium layers and matches the impedance of the opaque chromium and chromium oxide layers, which results in very low reflectance. Please note, presently the preferred range of thicknesses for the thin chromium layer is about 100 to 200 Angstroms. Prior art designs which use chromium or chromium oxide typically use at most single layers of chromium and chromium oxide and include neither the thin chromium layer nor the illustrated multilayer stack comprising two or more multiples of the $Cr_xO_y$/Cr design.

Referring again to FIG. 3, in another embodiment, the black shadow mask 14 is a Sio/Si-containing (silicon monoxide/silicon) design which includes four alternating layers of silicon monoxide and silicon. The silicon layer nearest the substrate is thin relative to the other silicon layer. The SiO/Si-containing black shadow mask 14 requires a relatively thick overcoat 15 to achieve the desired low transmission. The present example uses an overcoat comprising the metal molybdenum (Mo), but other materials such as germanium (Ge) and titanium (Ti) can be used effectively. TABLE 1 lists the associated thickness of an exemplary SiO/Si/Mo black shadow mask coating 14. The layers are in the preferred sequence substrate/SiO/Si/SiO/Si/Mo, which provides opacity and very low reflectance. Also, the composite is durable.

TABLE 1

| Layer # | Material | Thickness (Å) |
|---|---|---|
| 14-1 | SiO | 564 |
| 14-2 | Si | 77 |
| 14-3 | SiO | 203 |
| 14-4 | Si | 3000 |
| 15 | Mo | 1000 |

An advantage of the SiO/Si mask derives from the etchability of the silicon and silicon oxide materials. For example, the SiO/Si mask can be etched in fluorine-containing etch plasma. This provides better etch quality and definition for the SiO/Si mask than do the wet chemistry techniques typically required for etching the $Cr/CrO_2$ mask. To achieve similar etch quality in chromium and chromium oxide typically requires using a chlorine-containing plasma, which is corrosive and requires special equipment.

Other suitable materials suitable useful in the black matrix coating of the present invention include titanium (Ti)/titanium oxide ($TiO_2$) and tantalum (Ta)/tantalum oxide ($Ta_2O_5$).

Figure 4:
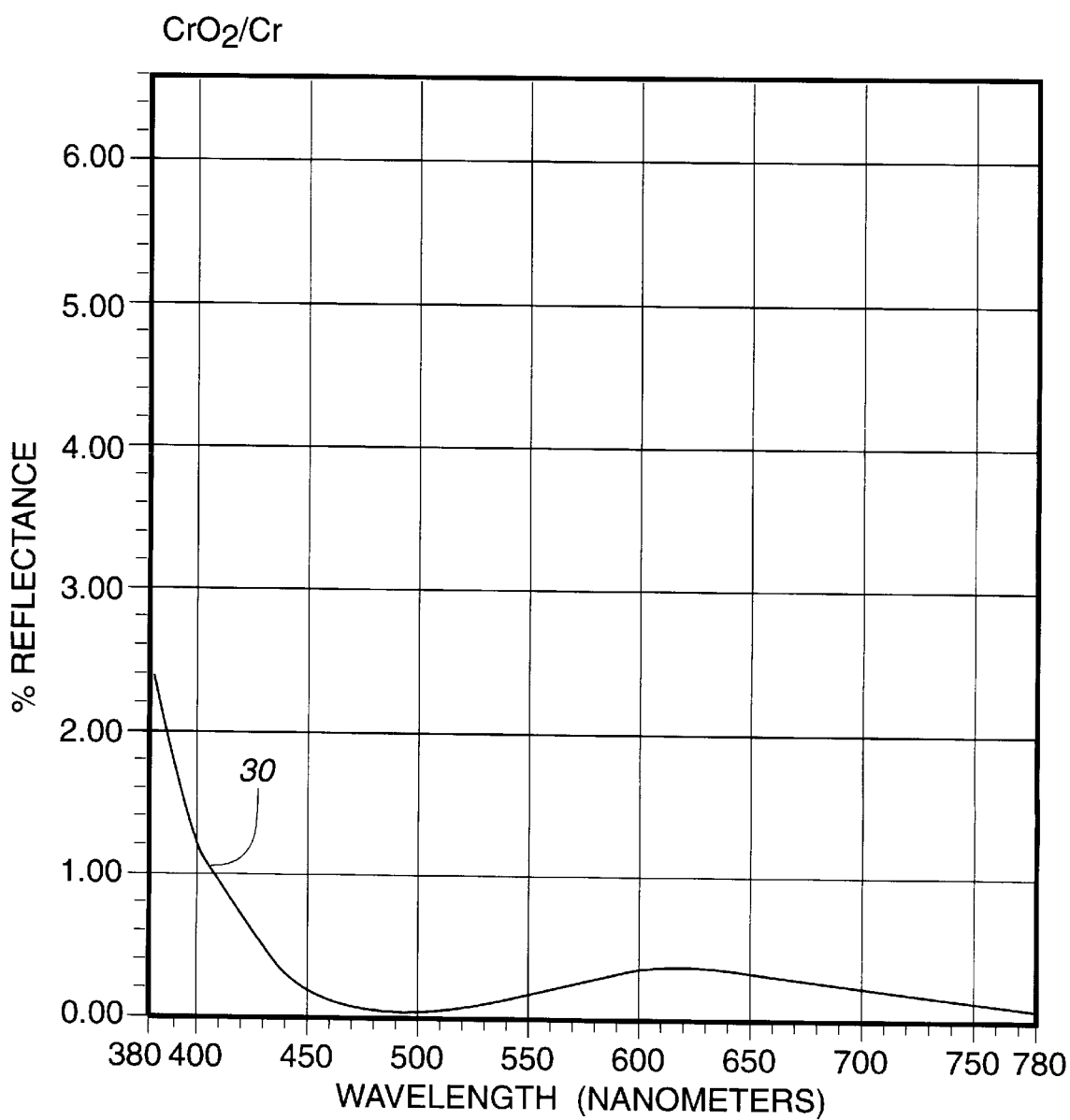
FIG. 4 is a graph of reflectance characteristics over the visible spectrum of a $Cr_xO_y$/Cr black shadow mask in accordance with FIG. 3 embodying the present invention.

TABLE 2 summarizes the physical and optical thickness of a $CrO_2$/Cr black shadow mask coating formed in accordance with the present application. As depicted in FIG. 4, the critical reflectance characteristic of the $CrO_2$/Cr shadow mask coating is very small, $\leq 1\%$ (typically much lower than 1%, closer to 0.2% to 0.4%), over the range 350 nanometers to 780 nanometers and beyond. This very low reflectance is approximately one order of magnitude smaller than the reflectance of 4%–6% which is typical of existing shadow mask coatings. In addition and as mentioned above, the coating is opaque, and has favorable etchability for and is compatible with the etching processes and equipment used for shadow masks. In addition, layers additional layers, including additional layers of chromium and chromium oxide, can be added to the chromium/chromium oxide coating 14, for example, to reduce reflectance from both sides of the coating. In addition, compounds and mixtures of chromium and chromium oxide with other materials will work in various applications. For example, the invention is applicable to (i.e., may use) existing techniques/materials such as nitride-doped chromium oxide and carburized chromium. By way of specific examples, the chromium oxide can be doped with approximately 10–20% nitrogen to control etch characteristics and partially carburized chrome can be used.

Figure 5:
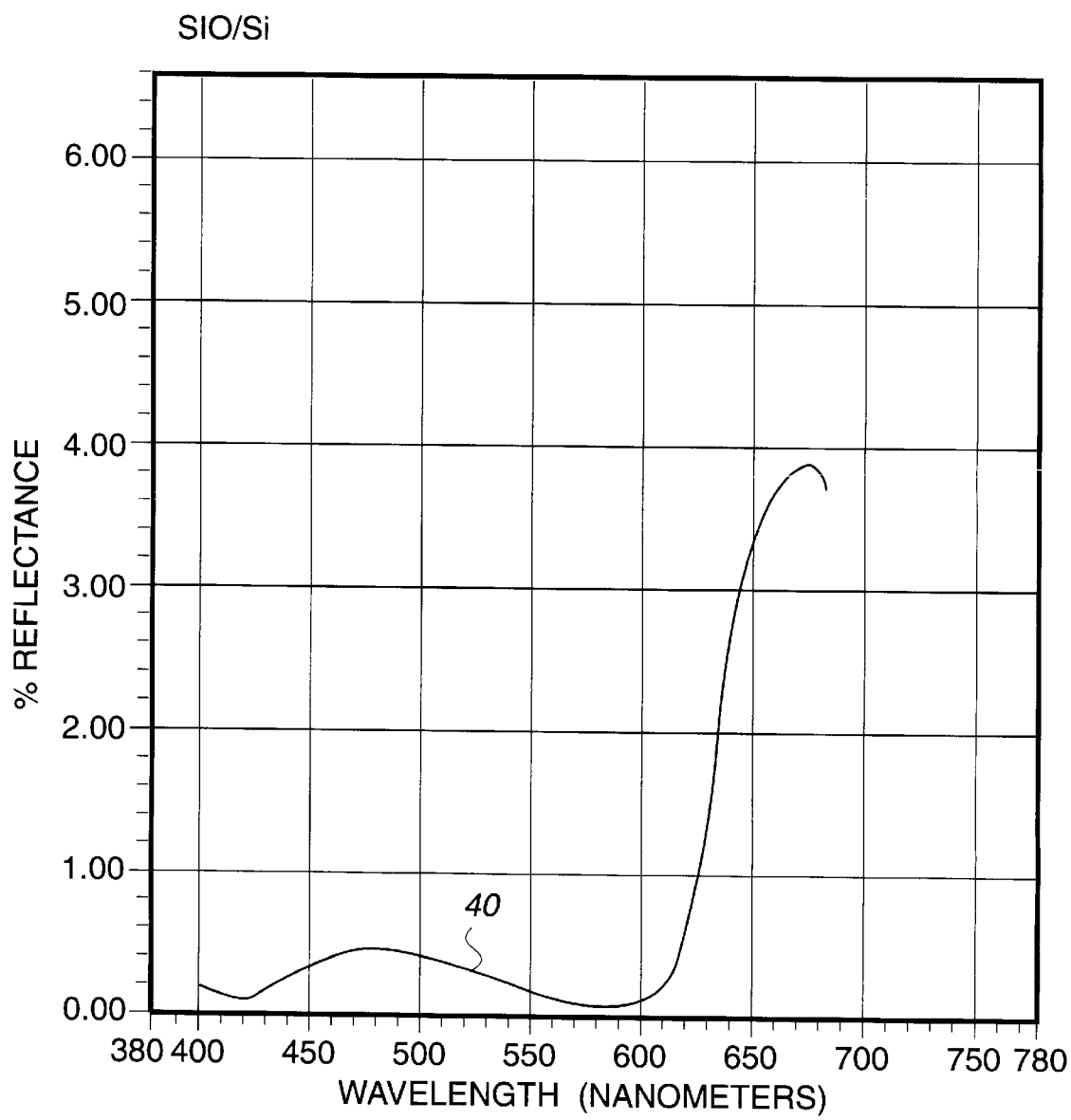
FIG. 5 is a graph of reflectance characteristics over the visible spectrum of a $Si_xO_y$/Si/Mo black shadow mask in accordance with FIG. 3 embodying the present invention.

TABLE 3 depicts details of the physical and optical thicknesses of the SiO/Si/Mo black shadow mask coating which is described in TABLE 2. As depicted in FIG. 5, the critical reflectance characteristics of the SiO/Si/Mo black shadow mask coating is very small, $\leq 1\%$ (typically much lower than 1%, closer to 0.1% to 0.5%), over the range about 400 nanometers to about 625 nm and beyond. (Please note, the FIG. 5 curve doesn't extend below 400 nm, but indicates the lower limit of the low reflectance band is shorter than 400 nm.) The very low reflectance of the SiO/Si/Mo black shadow mask is approximately one order of magnitude smaller than the reflectance of 4%–6% which is typical of existing shadow mask coatings. In addition and as mentioned above, the coating is opaque and durable and has favorable etchability for and is compatible with the etching processes and equipment used for shadow masks.

The low reflectance coatings of the present invention is illustrated here in the form of shadow mask coatings for an LCD such as an active matrix LCD. The invention has other applications, such as to dark mirrors. More generally, the invention is suitable to applications requiring high durability or low reflectance or combinations thereof.

TABLE 2

| DISPERSION OF C3 | LINEAR INTERPOLATION USED | | |
|---|---|---|---|
| (C3 = Cr) | | WVL | N | K |
| | REF: | 510.000 | 2.333 | 1.683 |
| | | 380.000 | 1.620 | 2.143 |
| | | 480.000 | 2.238 | 1.650 |
| | | 580.000 | 2.553 | 1.759 |
| | | 680.000 | 2.700 | 1.827 |
| | | 780.000 | 2.747 | 1.871 |

TABLE 2-continued

DISPERSION OF L — LINEAR INTERPOLLATION USED $(L = Cr_xO_y)$

| | WVL | N | K |
|---|---|---|---|
| REF: | 510.000 | 1.956 | 0.068 |
| | 380.000 | 1.900 | 0.180 |
| | 480.000 | 1.948 | 0.092 |
| | 580.000 | 1.928 | 0.052 |
| | 680.000 | 1.904 | 0.042 |
| | 780.000 | 1.921 | 0.034 |

| INCIDENT MEDIUM | MATCH WAVELENGTH | MATCH ANGLE | DEFINED IN MEDIUM |
|---|---|---|---|
| 1.5300 | 510.0000 | 30.0000 | 1.0000 |

| LAYER MAT'L | COMPLEX INDEX | PHYSICAL THICKNESS | MATCHED Q.W.O.T. | NORMAL Q.W.O.T. |
|---|---|---|---|---|
| 1 L | 1.956 | 0.067700 | 62.9625 | 475.9998 | 492.3362 |
| 2 C3 | 2.333 | 1.682738 | 17.0000 | 156.2458 | 158.6355 |
| 3 L | 1.956 | 0.067700 | 47.7236 | 360.9998 | 373.3892 |
| 4 C3 | 2.333 | 1.682738 | 100.0000 | 919.0928 | 933.1499 |

| MATERIAL | TOTAL PHYICAL THICK. | TOTAL Q.W.O.T |
|---|---|---|
| C3 | 117.0000 | 1075.3384 |
| L | 110.6501 | 836.9995 |

TOTAL PHYSICAL THICKNESS: 227.650 NANOMETERS (0.00896 MILS)
SUBSTRATE INDEX: 1,670  0.000
WAVELENGTH RANGES: 380.000  10.000  780.000
REFLECTANCE PERFORMANCE PLOT: FROM 0.000 TO 10.000
PERCENT GRID 6.00 INCHES WIDE AND 10.00 INCHES HIGH
INCIDENCE ANGLE: 0.000 DEGREES IN 1.000 MEDIUM
WEIGHTED PERFORMANCE FOR SOURCE = D65 SOURCE × PHOTOPIC

| REFLECTANCE | TRANS-MITTANCE | REVERSE REFL | FILM ABSORBANCE |
|---|---|---|---|
| 0.225 | 0.738 | 18.089 | 99.037 |

TABLE 3

BLACK MATRIX COATING USING SI BASED SYSTEM

DISPERSION OF SiO — SPLINE INTERPOLLATION USED

| | WVL | N | K |
|---|---|---|---|
| REF: | .510 | 1.936 | .014 |
| | .380 | 1.934 | .015 |
| | .468 | 1.934 | .015 |
| | .555 | 1.934 | .011 |
| | .643 | 1.948 | .007 |
| | .730 | 1.946 | .004 |

DISPERSION OF Si — SPLINE INTERPOLLATION USED

| | WVL | N | K |
|---|---|---|---|
| REF: | .510 | 4.308 | .629 |
| | .380 | 5.600 | 1.816 |
| | .468 | 4.406 | 1.090 |
| | .555 | 4.400 | .452 |
| | .643 | 4.247 | .152 |
| | .730 | 4.183 | .065 |

DISPERSION OF Si — SPLINE INTERPOLLATION USED

| | WVL | N | K |
|---|---|---|---|
| REF: | .510 | 4.308 | .629 |
| | .380 | 5.600 | 1.816 |
| | .468 | 4.406 | 1.090 |
| | .555 | 4.400 | .452 |
| | .643 | 4.247 | .152 |
| | .730 | 4.183 | .065 |

| INCIDENT MEDIUM | MATCH WAVELENGTH | MATCH ANGLE | DEFINED IN MEDIUM |
|---|---|---|---|
| 1.5800 | .5100 | 30.000 | 1.5800 |

| LAYER MAT'L | COMPLEX INDEX | PHYS THICK | MATCHED Q.W.O.T. | NORMAL Q.W.O.T. |
|---|---|---|---|---|
| 1 SiO | 1.936 | 013922 | .0564 | .3985 | .4365 |
| 2 Si | 4.308 | .628728 | .0077 | .1312 | .1334 |
| 3 SiO | 1.936 | .013922 | .0203 | .1435 | .1572 |
| 4 Si | 4.308 | .628728 | .3000 | 5.0838 | 5.1695 |

| MATERIAL | TOTAL PHYS THICK | TOTAL Q.W.O.T. |
|---|---|---|
| SO | .0767 | .5420 |
| S | .3000 | 5.0838 |
| S2 | .0077 | .1312 |

TOTAL PHYSICAL THICKNESS .384 MICROMETERS (.00002 INCH)

Having thus described preferred and alternative embodiments of the low reflectance coating of the present invention, those of usual skill in the art will readily develop additional modifications and embodiments which are within the scope of the invention, limited only by the scope of the appended claims.

What is claimed is:

1. A composite comprising: a substrate and a low reflectance coating comprising pairs of alternating layers comprising a material and a compound of said material on the substrate, the layer of said material nearest adjacent the substrate being relatively thin, wherein the low reflectance coating comprises, in order from the substrate, layers of silicon oxide, silicon, silicon oxide and silicon, and further including an overcoat comprising molybdenum for decreasing optical transmission through the composite.

2. A composite comprising: a substrate and a low reflectance coating comprising pairs of alternating layers comprising a material and a compound of said material on the substrate, the layer of said material nearest adjacent the substrate being relatively thin, wherein the low reflectance coating comprises, in order from the substrate, layers of titanium oxide, titanium, titanium oxide and titanium.

3. A composite comprising: a substrate and a low reflectance coating comprising pairs of alternating layers comprising a material and a compound of said material on the substrate, the layer of said material nearest adjacent the substrate being relatively thin, wherein the low reflectance coating comprises, in order from the substrate, layers of tantalum oxide, tantalum, tantalum oxide and tantalum.

4. A composite comprising: a substrate and a low reflectance coating comprising pairs of alternating layers comprising a material and a compound of said material on the substrate, the layer of said material nearest adjacent the substrate being relatively thin, wherein the low reflectance coating comprises, in order from the substrate, layers of chromium oxide, chromium, chromium oxide and chromium.

5. The composite of claim 4, wherein at least one of the chromium oxide-containing layers comprises nitrogen-containing chromium oxide.

6. The composite of claim 4, wherein at least one of the chromium-containing layers comprises carburized chromium.

7. A liquid crystal display cover panel, comprising: a glass substrate and a low reflectance coating comprising alternating pairs of layers comprising chromium oxide and chromium formed on the substrate, wherein the low reflectance coating comprises, in order from the substrate, layers of chromium oxide, chromium, chromium oxide and chromium, and at least the layer of chromium nearest adjacent the substrate being relatively thin.

8. A liquid crystal display cover panel, comprising: a glass substrate and a low reflectance coating comprising alternating pairs of layers comprising silicon oxide and silicon formed on the substrate, at least the layer of silicon nearest adjacent the substrate being relatively thin, and further comprising an optical transmission-reducing overcoat on the outermost layer of silicon, the overcoat comprises molybdenum.

9. The liquid crystal display cover panel of claim 8, wherein the low reflectance coating comprises, in order from the substrate, layers of silicon oxide, silicon, silicon oxide, and silicon.

* * * * *